US012681186B1

(12) United States Patent
Costea et al.

(10) Patent No.: US 12,681,186 B1
(45) Date of Patent: Jul. 14, 2026

(54) OBJECT AUTO-LABELING

(71) Applicant: Zoox, Inc., Foster City, CA (US)

(72) Inventors: Arthur Daniel Costea, Foster City, CA (US); David Pfeiffer, Foster City, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 1051 days.

(21) Appl. No.: 17/852,947

(22) Filed: Jun. 29, 2022

(51) Int. Cl.
| | |
|---|---|
| *G01S 17/931* | (2020.01) |
| *B60W 60/00* | (2020.01) |
| *G01S 7/48* | (2006.01) |

(52) U.S. Cl.
CPC .......... *G01S 17/931* (2020.01); *G01S 7/4802* (2013.01); *G01S 7/4808* (2013.01); *B60W 60/00* (2020.02); *B60W 2420/408* (2024.01)

(58) Field of Classification Search
CPC .... G01S 17/931; G01S 7/4802; G01S 7/4808; B60W 60/00; B60W 2420/408
See application file for complete search history.

(56) References Cited

U.S. PATENT DOCUMENTS

| | | | | |
|---|---|---|---|---|
| 12,007,728 | B1 * | 6/2024 | Mohta ..................... | G06V 20/56 |
| 2015/0006070 | A1 * | 1/2015 | Kim ....................... | G01S 7/4802 |
| | | | | 701/301 |
| 2022/0099838 | A1 * | 3/2022 | Kim ........................ | G01S 17/04 |
| 2022/0335178 | A1 * | 10/2022 | Stenson ................. | G01S 17/88 |
| 2023/0005278 | A1 * | 1/2023 | Kim ........................ | G06V 20/64 |
| 2023/0292117 | A1 * | 9/2023 | Hemantharaja ..... | H04W 12/069 |
| 2025/0189317 | A1 * | 6/2025 | Chandru ............ | G01C 21/1656 |

OTHER PUBLICATIONS

U.S. Appl. No. 17/215,938, filed Mar. 29, 2021, Goel, et al., "Hierarchical Machine-Learning Network Architecture", 46 pages.

* cited by examiner

*Primary Examiner* — Naeem Taslim Alam
(74) *Attorney, Agent, or Firm* — Lee & Hayes, P.C.

(57) ABSTRACT
Techniques for determining labels for potentially non-impeding objects in an environment are disclosed. Unlabeled lidar segments may be evaluated to determine whether they are located in a drivable road in an environment and to determine a lidar intensity value for the segments. Based on the intensity and whether the segment is in a drivable region, the system determines a corresponding range of lidar values associated with a label or no label. The system assigns the label (or no label) associated with the corresponding range. The label and associated segment data may then be used to classify an object associated with the segment, control a vehicle, and train a machine-learned model.

20 Claims, 5 Drawing Sheets

100

300

LIDAR PERCEPTION SYSTEM 304

LIDAR SENSOR DATA 302

TOP DOWN SEGMENTATION 306

CONVOLUTIONAL NEURAL NETWORK 308

LIDAR SEGMENT CLASSIFIER 310

SEGMENT CLASSIFIER(S) 312

CONSISTENCY CHECKER(S) 314

IMPEDING SEGMENT DATA 316

NON-IMPEDING SEGMENT DATA 318

SENSOR FUSION AND TRACKING SYSTEM 320

NON-IMPEDING OBJECT TRACKING SYSTEM 322

NON-IMPEDING OBJECT TRACKS 324

OBJECT AUTO-LABELING

BACKGROUND

Various systems and techniques are utilized to perform detection of objects, such as vehicles, pedestrians, and bicycles, in an environment. For example, autonomous vehicles may be configured with lidar systems that use lasers to emit pulses into an environment and sensors to detect pulses that are reflected back from surfaces of objects in the environment. Various properties of the reflected pulses can be measured to generate data representing the presence and various characteristics of objects in the environment. However, fine particulate matter, gases, vapors, leaves, debris, and other objects that do not impede the travel of a vehicle may also reflect these pulses. For example, fog, smoke, exhaust, steam, dust, falling leaves, pieces of paper, and other such objects may reflect laser pulses. Pulses reflected off such a non-impeding objects may produce a false positive indication of the existence of an impeding surface at the location of the object, even though the object at that location may not impede the movement of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
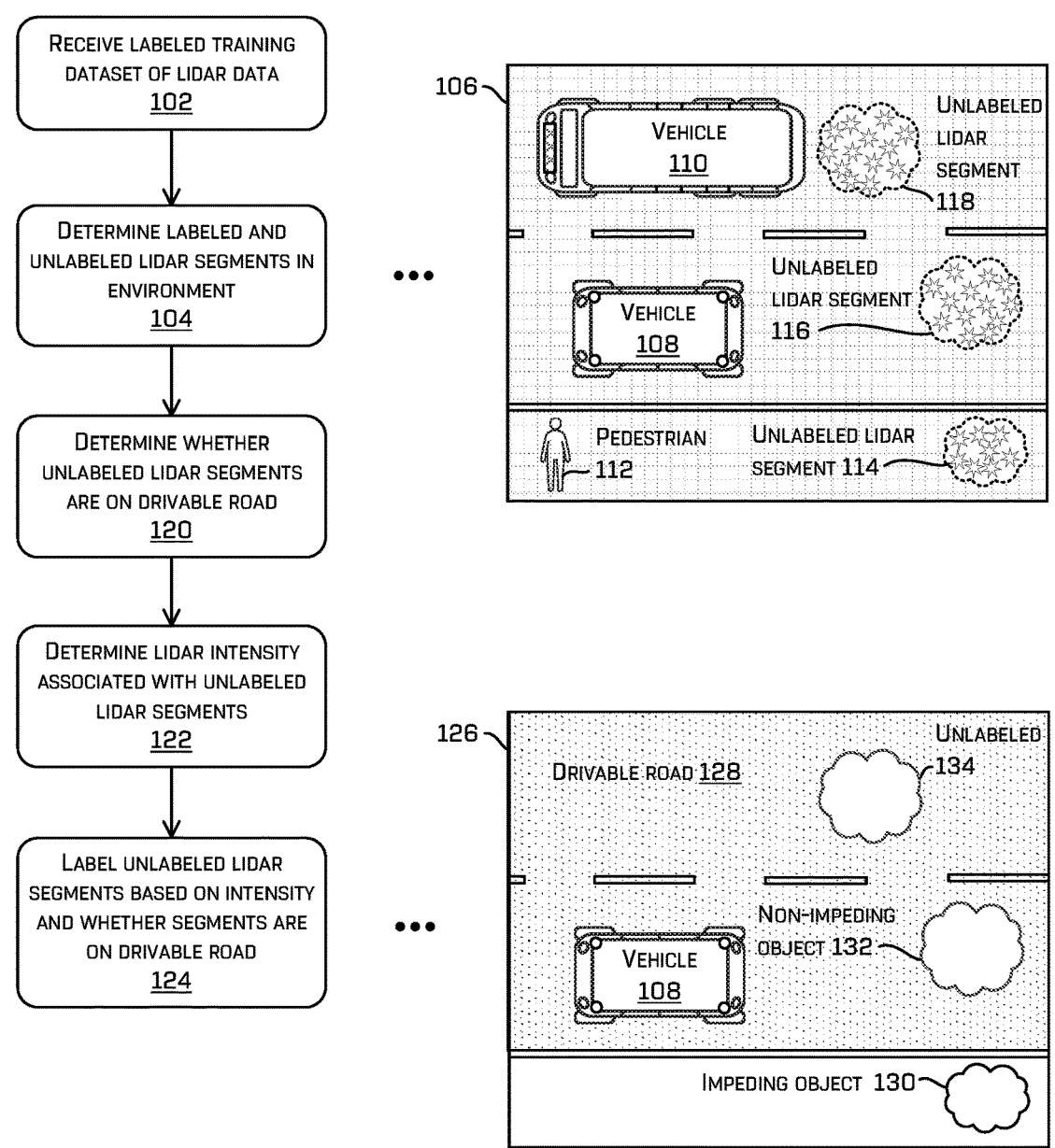
FIG. 1 is a pictorial flow diagram of an example process for determining an object classification for unlabeled lidar segments, in accordance with examples of the disclosure.

Techniques for improving non-impeding object detection and for training models to identify and classify non-impeding objects and associated detections discussed herein may include training a model to label unlabeled lidar segments based on a lidar intensity associated with such segments. The model may then be used, for example in conjunction with other perception and/or classification systems and/or components, to detect and label non-impeding objects in a real-world environment at a vehicle that may be traveling through the environment.

A non-impeding object may be an object in an environment that should not impede the motion of vehicle in the environment, such as an object composed of fine particulate matter (e.g., dust), gases (fog, steam, smoke), or an object that is immaterial to vehicle progress (e.g., plastic bag, paper debris, tumbleweed, leaves, etc.). A non-impeding object may inadvertently be detected by a perception system to be a solid object (such as debris) which should impede movement of a vehicle and be avoided. A non-impeding object may have one or more surfaces capable of reflecting lidar pulses and/or other one or more other types of emissions. According to the techniques described herein, objects may be detected by a sensor system and determined to be objects of particular types by a vehicle computing system (e.g., by a machine-learned model executed by the vehicle computing system using sensor data). When the vehicle computing system determines than an object is a non-impeding object, the vehicle computing system (e.g., a planning component of the vehicle computing system) may plan a trajectory that disregards that object because a non-impeding object should not impede the travel of a vehicle through an environment. However, an accurate labeling of a solid or otherwise vehicle-impeding object as a non-impeding object may result in a hazardous vehicle trajectory. The techniques described herein may improve the accuracy of impeding and non-impeding object determinations and labeling, ensuring that such objects are more accurately labeled by one or more machine-learned models trained and executed according to the disclosed examples.

In various examples, a system may train a machine-learned model to perform non-impeding object auto-labeling using a training dataset that includes data representing sensor data collected in an environment. For example, such data may include lidar data associated with one or more lidar points (e.g., reflections of one or more lidar pulses). The lidar data in a training dataset may represent groups of lidar points referred to as "lidar segments." Lidar segments may be groups of lidar points that are (e.g., geographically, physically) proximate to one another and/or have other similar characteristics that may indicate such points may be associated with a particular object. In various examples, a lidar segment may include at least a threshold quantity of lidar points to be included in as a segment in a training dataset. For example, individual segments in a dataset may be associated with two or more lidar points, three or more, lidar points, etc. Alternatively, segments in a dataset may be associated with two or more lidar points. Alternatively or additionally, individual lidar points and associated data may be included in a dataset along with, or instead of, lidar segments. In such examples, individual lidar points and associated data may be processed as described herein, while in other examples, individual lidar points and associated data may be filtered from the dataset before processing the dataset as described herein. In some examples, lidar segments as opposed to points may be used to avoid processing spurious signals (e.g., noise) and/or miniscule objects.

The data associated with individual lidar points and/or lidar segments in a training dataset may include intensity data associated with such points and/or segments. The data associated with individual lidar points and/or lidar segments in a training dataset may also, or instead, include one or more labels and/or an indication that respective points and/or segments are unlabeled. The data associated with individual lidar points and/or lidar segments in a training dataset may also, or instead include an indication of whether respective points and/or segments are located within, or sufficiently proximate to (e.g., within a threshold distance of), a drivable road associated with a vehicle associated with the training data. The data associated with individual lidar points and/or lidar segments in a training dataset may also, or instead include an indication of whether respective points and/or segments are not located within, or sufficiently proximate to (e.g., within a threshold distance of), a drivable road associated with a vehicle associated with the training data (e.g., are instead associated with a non-drivable region of the environment associated with a vehicle). The data associated with individual lidar points and/or lidar segments in a training dataset may also, or instead include other data that may be used by the system to determine or otherwise obtain data associated with the individual lidar points and/or lidar segments, including, but not limited to, intensity, object label and/or classification, location (e.g., that may be used to determine if the point or segment is within a drivable road), and/or position.

In various examples, the system (e.g., training the machine-learned model, among other functions) may determine the lidar segments and/or points in the training dataset that are associated with an existing label (e.g., indicating an object, point, or segment classification) and exclude those segments and/or points from the non-impeding object auto-labeling training process. In other words, the system may determine those points and/or segments that are unlabeled in the dataset for use in non-impeding object auto-labeling training. The system may then determine, from among the unlabeled points and/or segments, the points and/or segments that are within a drivable road of a vehicle associated with the training dataset and/or the points and/or segments associated with a non-drivable region of the environment associated with the training dataset. For example, the system may determine based on location data associated with such points and/or segments whether the location of the points and/or segments corresponds to a location of a drivable road in an environment associated with the training dataset. In some examples, the system may use map data stored at the system and/or received from a vehicle (e.g., via simultaneous localization and mapping (SLAM) techniques conducted at the vehicle) to make this determination. Alternatively or additionally, the system may determine based on location data associated with such points and/or segments whether the location of the points and/or segments corresponds to at track, path, and/or trajectory associated with the vehicle associated with the training dataset. Alternatively or additionally, the system may determine whether data associated with such points and/or segments in the training dataset indicates that the points and/or segments are located in a drivable road or a non-drivable region. Other techniques for determining whether a particular point and/or segment is within a drivable road or a non-drivable region may also, or instead, be used.

The system may determine an intensity value for the individual points and/or segments that are located in a drivable road and/or for the points and/or segments that are located in a non-drivable region. An intensity value may represent the strength of one or more return lidar pulses. In various examples, an intensity value for a lidar point may be a ratio of the strength of the return lidar pulse to the strength of emitted lidar pulse. In various examples, lidar intensity may be a unitless value that may be represented by an integer value from zero to 255 representing the (e.g., relative) this ratio, a floating-point number, or other. This intensity value may be received from a lidar sensor. In various examples, the intensity value may indicate a reflectivity of a surface. For example, a lower number indicates less of the emitted light was reflected by the surface (e.g., lower reflectivity surface) while a higher number indicates more of the emitted light was reflected by the surface (e.g., higher reflectivity surface). In this example, zero intensity may indicate that no light was reflected from a surface while an intensity of 255 may indicate that 100% of the emitted light was reflected from a surface. The intensity may be affected by other factors as well including channel disruption (e.g., from fog), partially transparent surfaces, partial reflection due to partial coverage of a surface/edge by a lidar emission, etc.

For example, the system may determine, based on the sensor data represented in the training dataset, a lidar intensity value for the individual points and/or segments that are located in a drivable road and for the points and/or segments that are located in a non-drivable region. In various examples, the intensity of a particular lidar segment may be an aggregate intensity value based on one or more individual intensity values for one or more individual lidar points associated with the particular lidar segment. For example, an intensity value for a particular lidar segment may be an average of one or more individual intensity values for one or more individual lidar points associated with the particular lidar segment. One or more algorithms and/or techniques may be used to determine an intensity value for a lidar segment. In various examples, one or more lidar segment intensity values may be provided in the training dataset, while in other examples, the system may instead, or also, determine one or more lidar segment intensity values based on other data in the training dataset.

Using the determined intensity values for the unlabeled points and/or segments, the system may determine a label indicating an object classification and/or whether to associate a label with the unlabeled points and/or segments. The determined label may be further based at least in part on whether the unlabeled points and/or segments are associated with (e.g., in or substantially proximate to) a drivable road or region in the environment. For example, the system may use a first set of intensity value ranges to determine a label for individual unlabeled points and/or segments that are not associated with a drivable road or region and a second set of intensity value ranges to determine a label for individual unlabeled points and/or segments that are associated with a drivable road or region. The first set of ranges and second set of ranges may be distinct: however, in some examples these sets of ranges may be the same.

In various examples, for individual unlabeled points and/or segments that are associated with a non-drivable region (e.g., not associated with a drivable road or region), the system may determine whether the associated intensity values are within or otherwise correspond to a relatively low range of intensity values or a relatively high range of intensity values, where together the low and high ranges of intensity values represent the continuous range of available intensity values. For example, the system may determine whether individual unlabeled points/segments that are associated with a non-drivable region have associated intensity values within the low range of intensity values. The low range of intensity values may include a range of specific intensity values (between zero and ten, between zero and twenty, etc.), a range of intensity percentages (e.g., between zero and ten percent of the total intensity value range, between zero and twenty percent of the total intensity value range, etc.), or any suitable range that may represent a range of intensity values. In various examples, the values within the low range of intensity values may be determined based on data (e.g., statistical data) determined from machine-learned model execution in operational environments, sensor data collected in operational environments, other test data, etc. It should be understood that the intensity values given are examples and may be tailored to a certain sensor system. For those unlabeled points/segments associated with a non-drivable region that have an intensity value within the low range, the system may not label the points/segments and/or may indicate that the points/segments are unlabeled.

The high range of intensity values may also include a range of specific intensity values (between 10 and 255, between 20 and 55 etc.), a range of intensity percentages (e.g., between 10 and 100 percent of the total intensity value range, between 20 and 100 percent of the total intensity value range, etc.), or any suitable range that may represent a range of intensity values. In various examples, the values within the high range of intensity values may be determined based on data (e.g., statistical data) determined from machine-learned model execution in operational environments, sensor data collected in operational environments, other test data, etc. For those unlabeled points/segments associated with a non-drivable region that have an intensity value within the high range of intensity values, the system may label the points/segments as "impeding" objects and/or otherwise associate such points/segments with an object classification that indicates the points/segments are associated with one or more impeding objects.

In various examples, for individual unlabeled points and/or segments that are associated with a drivable road or region, the system may determine whether the associated intensity values are within or otherwise correspond to a relatively low range of intensity values, a relatively moderate range of intensity values, or a relatively high range of intensity values, where together the ranges of intensity values represent the continuous range of available intensity values. For example, the system may determine whether individual unlabeled points/segments that are associated with a drivable road or region have associated intensity values within the low range of intensity values. The low range of intensity values may include a range of specific intensity values (between zero and one, between zero and ten, etc.), a range of intensity percentages (e.g., between zero and one percent of the total intensity value range, between zero and ten percent of the total intensity value range, etc.), or any suitable range that may represent a range of intensity values. In various examples, the values within the low range of intensity values may be determined based on data (e.g., statistical data) determined from machine-learned model execution in operational environments, sensor data collected in operational environments, other test data, etc. For those unlabeled points/segments associated with a drivable road or region that have an intensity value within the low range of intensity values, the system may label the points/segments as "non-impeding" objects and/or otherwise associate such points/segments with an object classification that indicates the points/segments are associated with one or more non-impeding objects.

The moderate range of intensity values may also include a range of specific intensity values (between one and ten, between one and twenty, etc.), a range of intensity percentages (e.g., between one percent and ten percent of the total intensity value range, between one percent and twenty percent of the total intensity value range, etc.), or any suitable range that may represent a range of intensity values. In various examples, the values within the moderate range of intensity values may be determined based on data (e.g., statistical data) determined from machine-learned model execution in operational environments, sensor data collected in operational environments, other test data, etc. For those unlabeled points/segments associated within a drivable road or region that have an intensity value within the moderate range of intensity values, the system may not label the points/segments and/or may indicate that the points/segments are unlabeled.

The high range of intensity values may also include a range of specific intensity values (between 10 and 255, between 20 and 255, etc.), a range of intensity percentages (e.g., between 10 percent and 100 percent of the total intensity value range, between 20 percent and 100 percent of the total intensity value range, etc.), or any suitable range that may represent a range of intensity values. In various examples, the values within the high range of intensity values may be determined based on data (e.g., statistical data) determined from machine-learned model execution in operational environments, sensor data collected in operational environments, other test data, etc. For those unlabeled points/segments associated with a drivable road or region that have an intensity value within the high range of intensity values, the system may label the points/segments as "impeding objects" and/or otherwise associate such points/segments with an object classification that indicates the points/segments are associated with one or more impeding objects.

The lidar points/segments having associated intensities that fall into the lower intensity ranges as described above may be more likely to be associated with non-impeding objects. This is because objects that are likely to be non-impeding are likely to be less reflective and/or have fewer reflective surfaces than impeding objects. For example, dust particles, steam, smoke, and other fine particulate matter or gases are likely to reflect fewer lidar pulses and with less intensity than solid objects due to their dispersed and/or non-solid surfaces.

In various examples, the system may rely on one or more other classification models and/or systems to label those points and/or segments that remain unlabeled or are indicated as unlabeled. In such examples, when the machine-learned model is executed following training, the system may classify or otherwise label all individual lidar segments and/or points and/or the associated objects that are detected in an environment using lidar sensors.

In various examples, a machine-learned model trained as described herein may be executed by individual lidar sensors and/or one or more associated components. In various examples, a lidar perception system that may receive lidar data from one or more lidar sensors may also, or instead, execute a machine-learned model trained as described herein. In various examples, one or more such machine-learned models trained as described herein may be executed by one or more such system configured at a vehicle, such as an autonomous vehicle.

A vehicle according to the disclosed examples may be configured with sensor systems may be configured at a vehicle that includes one or more emitters and one or more sensors. For example, a lidar system may be configured at a vehicle that includes one or more lidar emitters and one or more lidar sensors. The lidar system may emit lidar pulses into an environment and receive return pulses at the one or more lidar sensors that have been reflected by various objects in the environment into which the lidar pulses were emitted. The lidar system and/or a vehicle computing system configured at the vehicle may detect objects in the environment using these return pulse(s). As noted, individual lidar sensors may be configured with a machine-learned model trained as described herein to auto-label non-impeding objects. The lidar sensors may collect, generate, and/or determine lidar data as described herein, for example, using one or more machine-learned models.

A vehicle computing system may use lidar data collected, generated, and/or determined by such one or more lidar sensors to categorize objects detected in an environment. For example, a vehicle computing system may determine labels for lidar segments that may then be used to indicate associated types of objects, such as pedestrians, cars, trucks, bicycles, etc. In various examples, the vehicle computing system may use one or more machine-learned models trained as described herein to determine that one or more objects detected in an environment are non-impeding objects. The vehicle computing system may execute the one or more machine-learned models trained as described herein in conjunction with one or more other classifiers, consistency components, and segmentation systems to make such determinations. The vehicle computing system may base such determinations on lidar data received from one or more lidar sensors as described herein. The vehicle computing system may label or otherwise categorize such objects with a "non-impeding" label or tag.

The resulting data determined using the disclosed techniques, including labels and associated points/segments and/or unlabeled points/segments, may be used to train one or more machine-learned models to preform various operations. For example, the labeled non-impeding object data determined herein may be used as training data to improve the operations performed by a machine-learned model for identification and classification of non-impeding objects, Examples of training a machined-learned model and performing a labeling process are provided in U.S. patent application Ser. No. 17/215,938, filed Mar. 29, 2021, entitled "Hierarchical Machine-Learning Network Architecture," the entirety of which is incorporated herein by reference.

When a machine-learned model trained according to the disclosed techniques is executed in a vehicle computing system, the model may perform non-impeding object determinations and labeling that may be used to control the vehicle. For example, based on the non-impeding object determinations and labeling, the vehicle computing system may determine a vehicle trajectory that handles an object determined to be a non-impeding object by disregarding the object when planning a vehicle trajectory or adjusting a vehicle trajectory based on the object being a non-impeding object (e.g., slowing down rather than stopping). Additionally or alternatively, the perception component that determines whether an object is non-impeding may provide a confidence score associated with the non-impeding object indication to a planning component of the vehicle. In such an example, the planning component may use the confidence score as a cost, among multiple costs considered, in determining the trajectory. Additionally or alternatively, based on the disclosed lidar non-impeding object detection and labeling operations, the vehicle computing system may determine that an object in the environment is likely not a non-impeding object (e.g., is instead likely an impeding or solid object) and may then generate or adjust a vehicle trajectory to treat the object as an impeding object or some other type of object having one or more solid surfaces. For example, the vehicle computing system may adjust or generate a trajectory to navigate the vehicle around the impeding object or stop the vehicle before encountering the impeding object.

The systems and techniques described herein may be directed to training and leveraging machine-learned models, lidar data, and associated data to improve object detection used by a vehicle, such as an autonomous vehicle, in an environment. More specifically, the disclosed systems and techniques may be directed to facilitating more accurate detection of non-impeding objects and reducing false des-ignations of solid or otherwise travel-impeding objects as non-impeding objects. Using this improved data, such a vehicle may generate safer and more efficient trajectories for use in navigating through an environment. In particular examples, the systems and techniques described herein can utilize lidar training datasets to train machine-learned models to more accurately and efficiently determine whether objects in an environment are non-impeding objects. By using these models trained according to the disclosed examples, vehicle computing systems may more accurately distinguish between solid objects that may present a hazard to an autonomous vehicle and non-impeding objects that may be safely disregarded. The examples described herein may result in increased certainty and accuracy object detections, thereby allowing an autonomous vehicle to generate more accurate and/or safer trajectories for the autonomous vehicle to traverse in the environment.

For example, techniques described herein may increase the reliability of the determination of the solidity of objects in the environment, reducing the likelihood of inaccurately designating an object as a non-impeding object or a solid object. That is, the techniques described herein provide a technological improvement over existing object detection, classification, tracking, and/or navigation technology. In addition to improving the accuracy of object detections and classifications of such objects, the systems and techniques described herein can provide a smoother ride and improve safety outcomes by, for example, more accurately providing safe passage to an intended destination through an environment that is also occupied by one or more objects that may include non-impeding objects. Moreover, the systems and techniques may prevent unnecessary braking or hard-braking to avoid objects that can actually be passed through.

The techniques described herein may also improve the operation of computing systems and increase resource utilization efficiency. For example, computing systems, such as vehicle computing systems, may more efficiently perform non-impeding object determinations using one or more machine-learned models trained according to the techniques described herein because, by auto-labeling non-impeding objects using such a model, the disclosed examples may reduce the amount of manual labeling required to generate subsequent lidar training datasets. The disclosed examples may also reduce the data processing required to determine and label non-impeding objects because the machine-learned models trained according to the disclosed examples may increase the accuracy of such determinations, thereby reducing the need to correct and/or adjust labeling by other systems and processes (e.g., consistency components) associated with a vehicle computing systems. This reduction in extraneous processing therefore increases the overall efficiency of such systems over what would be possible using conventional techniques. Moreover, the techniques discussed herein may reduce the amount of data used by computing systems to determine and process object labels as the number of labels applied to various objects may be reduced due to improved initial auto-labeling, which may reduce latency, memory usage, power, time, and/or computing cycles required to detect and categorize objects detected in an environment.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, although discussed in the context of pulses originating as lidar emissions, detection using lidar sensors, and processing using lidar sensor and lidar point data, other types of sensors and emitters are contemplated, as well as other types of sensor data. Furthermore, the disclosed systems and techniques may include using various types of components and various types of data and data structures, including, but not limited to, various types of image data and/or sensor data (e.g., stereo cameras, time-of-flight data, radar data, sonar data, and the like). For example, the techniques may be applied to any such sensor systems. Additionally, the techniques described herein can be used with real data (e.g., captured using sensor(s)), simulated data (e.g., generated by a simulator), or any combination of the two.

Figure 3:
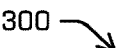
FIG. 3 is a block diagram of an example lidar perception system and an example non-impeding object tracking system, in accordance with examples of the disclosure.

FIG. 1 is a pictorial flow diagram of an example process 100 for training a machine-learned model to determine whether and how to auto-label lidar segments and/or points based on intensity and location, for example as impeding or non-impeding objects, based on lidar data representing data detected in an environment in which a vehicle may be operating. In some examples, one or more operations of the process 100 may be implemented by a vehicle computing system, such as by using one or more of the components and systems illustrated in FIGS. 3-5 and described below. For example, one or more components and systems can include those associated with one or more of the one or more sensor systems 404 and 506, one or more of the perception components 304, 406, and 522, and/or one or more of the planning components 418 and 528. In some examples, the one or more operations of the process 100 may also, or instead, be performed by a remote system in communication with a vehicle, such as the perception component 544 and/or planning component 550 of the computing device(s) 538 illustrated in FIG. 5. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 3-5 are not limited to performing the process 100.

At operation 102, a training dataset may be received at a machine-learned model training and/or execution system (e.g., a vehicle computing system). In particular examples, this training dataset may include sensor data such as lidar data. The lidar data in such a training dataset may represent data determined by a lidar system that emitted one or more lidar pulses into an environment with one or more lidar emitters and detected one or more return pulses with one or more lidar sensors (e.g., photodetectors). For example, such data may include one or more lidar segments, individual segments of which may be composed of one or more associated (e.g., proximate) lidar points. In examples, lidar points that are within a threshold distance of one another and/or share one or more common properties may be grouped into a lidar segment. Such lidar segments may represent candidate objects, for example, lidar points that are likely to be associated with a particular object based on having similar characteristics (e.g., location, lidar characteristics). Such data may also, or instead, include one or more lidar points and associated data, and the operations of the process 100 described in regard to segments may also be performed for individual lidar points and associated data. The training dataset received at operation 102 may represent a top-down gird of cells where individual cells may be associated with one or more lidar segments. Lidar segment data, such as location data, label data, intensity data, etc., may also be associated with particular cells.

The training dataset may include label data associated with the represented lidar segments. For example, one or more individual segments represented in the training dataset may be labeled with an indicator of a particular object type (e.g., car, bus, bicycle, pedestrian), while one or more other individual segments may not be labeled. In various examples, it is these unlabeled lidar segments that the machine-learned model may be trained to auto-label as impeding or non-impeding objects as described herein.

To determine labels for such unlabeled lidar segments, the system may use one or more pieces of data associated with the segments that may be included in the training data set received at operation 102. For example, the training dataset may include intensity data for one or more of the individual represented lidar segments. This intensity data may include an intensity value for the particular lidar segment that may be an average or aggregated intensity value based on one or more individual intensity values for one or more individual lidar points associated with the particular lidar segment. The training dataset may also, or instead, include an indication of whether the individual lidar segments are associated with a drivable road or region of the environment and/or a non-drivable region of the environment. For example, such an indication may indicate whether a particular lidar segment (e.g., one or more of the lidar points associated with the segment, a majority of the lidar points associated with the segment) is located within, or sufficiently proximate to, a drivable road associated with a vehicle associated with the training data. Alternatively or additionally, the training dataset may include location data associated with one or more lidar segments that the system may use to determine whether individual particular lidar segments are associated with a drivable road or region of the environment.

At operation 104, the system (e.g., training the machine-learned model) may determine one or more lidar segments represented in the training dataset that are labeled and one or more lidar segments represented in the training dataset that are unlabeled. For example, one or more of the segments represented in the training dataset may be labeled indicating, for example, an object classification (e.g., pedestrian, bus, car, bicycle), while one or more other segments represented in the training dataset may not be labeled with an object classification. The system may determine the unlabeled lidar segments from the training dataset for use in the process 100. In various examples, the training dataset may have no labels, that is, none of the lidar segments may have associated labels (e.g., all lidar segments in the training dataset are unlabeled lidar segments), while in other examples, one or more of the lidar segments represented in the training dataset may have associated labels.

An example 106 illustrates an example of such training data that may represent a top-down view of an environment in which a vehicle 108 may be traveling. In this example, the training dataset may represent data collected and/or determined by a lidar system configured at the vehicle 108. The training dataset may be a multichannel top-down image, for example, encoded by a lidar system, perception system, and/or vehicle computing system configured at the vehicle 108. A vehicle 110 and a pedestrian 112 may be represented in the training dataset as lidar segments within the environment and labeled accordingly (e.g., may have associated object label data of the training dataset). The training dataset of the example 106 may also include one or more unlabeled lidar segments, such as unlabeled lidar segments 114, 116, and 118. Any one or more of unlabeled lidar segments 114, 116, and 118 may be an individual lidar point. The lidar segments 114, 116, 118 may be transformed or modeled as multichannel top-down image(s) wherein lidar data is stored or otherwise represented from a two-dimensional top-down perspective of an environment. Channels of a multi-channel image can respectively encode different features in the environment (e.g., velocity information, classification information, heigh information, etc.). Such images can readily be processed using graphical processing units and related techniques.

At operation 120, the system may determine whether unlabeled lidar segments in the training dataset are associated with a drivable or road or region. For example, the system may compare location data associated with individual unlabeled lidar segments (e.g., included in the training dataset or otherwise obtained or determined) to map data and/or vehicle trajectory data (e.g., included in the training data set or otherwise obtained or determined) to determine whether the individual unlabeled lidar segments are associated with a drivable region or road. Alternatively, the training dataset may include data indicating whether one or more individual unlabeled lidar segments are associated with a drivable road or region.

At operation 122, the system may determine an intensity for the unlabeled lidar segments in the training dataset. For example, the system may determine, based on the lidar data in the training dataset, a lidar intensity value for the individual unlabeled lidar segments that are located in a drivable road and for the individual unlabeled lidar segments that are located in a non-drivable region. In various examples, the lidar intensity value associated with an individual lidar segment may be an aggregate intensity value based on one or more individual intensity values for one or more individual lidar points associated with the respective individual lidar segment.

At operation 124, the system may use the determined intensity values for the unlabeled lidar segments located in a drivable road and the intensity values for the unlabeled lidar segments located in a non-drivable region to determine a label indicating an object classification. For those unlabeled lidar segments that are located in a non-drivable region, the system may also determine to not label the segments.

For example, the system may determine if the intensity values associated with unlabeled lidar segments that are associated with a non-drivable region fall within a range of lidar identity values from among two or more ranges of intensity values. For example, the system may determine if the intensity value of an individual lidar segment associated with a non-drivable region falls within a relatively low range of values or a relatively high range of values. If the intensity value for the segment falls within the relatively low range of values, the system may determine not label that segment and/or take one or more actions to indicate that that segment has not been determined to be associated with either an impeding or non-impeding object. If the intensity value for the segment falls within the relatively high range of values, the system may determine to label that segment as an impeding object. A more detailed example of the process of determining whether and how to label unlabeled lidar segments that are associated with a non-drivable region is described herein in regard to FIG. 2.

Further at operation 124, the system may determine if the intensity values associated with unlabeled lidar segments that are associated with a drivable road or region fall within a range of lidar identity values from among two or more ranges of intensity values. For example, the system may determine if the intensity value of an individual lidar segment associated with a drivable road falls within a relatively low range of values, a relatively moderate or middle range of values, or a relatively high range of values. If the intensity value for the individual lidar segment associated with a drivable road falls within the relatively low range of values, the system may determine to label that segment as a non-impeding object. If the intensity value for the segment falls within the relatively moderate or middle range of values, the system may determine not label that segment and/or take one or more actions to indicate that that segment has not been determined to be associated with either an impeding or non-impeding object. If the intensity value for the segment falls within the relatively high range of values, the system may determine to label that segment as an impeding object. A more detailed example of the process of determining whether and how to label unlabeled lidar segments associated with a drivable road or region is described herein in regard to FIG. 2.

An example 126 illustrates an example of the resulting labeling applied to the unlabeled lidar segments of the training data set represented in the example 106. In this example, the system has determined from the training dataset that the region 128 is a drivable road or region in the environment represented by the training dataset. The system has further determined that the unlabeled lidar segment 114 is not in the drivable road or region 128 (e.g., is in a non-drivable region). Furthermore, the system has determined that the unlabeled lidar segment 114 has an intensity value that falls within a range of intensity values that corresponds to impeding objects, and therefore has applied the impeding object label 130 to the formerly unlabeled lidar segment 114.

As also shown in this example, the system has further determined that the unlabeled lidar segment 116 is within or sufficiently proximate to the drivable road or region 128. Furthermore, the system has determined that the unlabeled lidar segment 116 has an intensity value that falls within a range of intensity values that corresponds to non-impeding objects, and therefore has applied the non-impeding object label 132 to the formerly unlabeled lidar segment 116.

As also shown in this example, the system has further determined that the unlabeled lidar segment 118 is within or sufficiently proximate to the drivable road or region 128. Furthermore, the system has determined that the unlabeled lidar segment 118 has an intensity value that falls within a range of intensity values that corresponds to no label or to otherwise leaving such lidar segments unlabeled, and therefore has not applied a label or otherwise leaves the segment 118 as unlabeled 134.

In various embodiments, the lidar segment data generated at operation 124 may be used to further train a machine-learning model. For example, this data may be recursively provided as training data the machine-learned model that generated the data to further refine the training of the machine-learned model. In examples, the data may include lidar segments that remain unlabeled and/or were otherwise indicated as unlabeled by the machine-learned model. The machine-learned model may recursively process such data to determine one or more labels for such segments.

Figure 2:
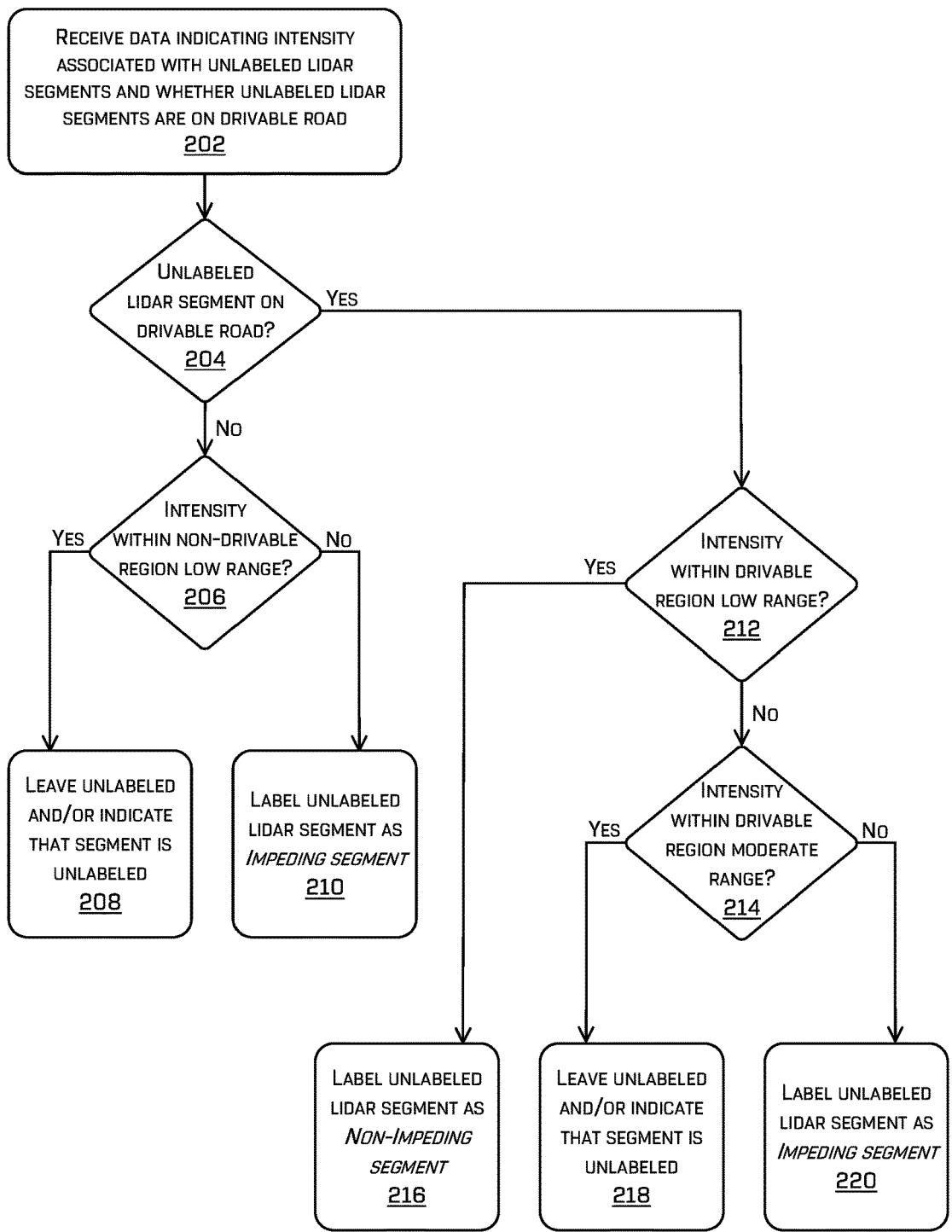
FIG. 2 is a flow diagram of an example process for determining an object classification for unlabeled lidar segments, in accordance with examples of the disclosure.

FIG. 2 is a flow diagram of an example process 200 for training a machine-learned model to determine and auto-label lidar segments based on lidar intensity data and ranges of lidar intensity values. In some examples, one or more operations of the process 200 may be implemented by a vehicle computing system, such as by using one or more of the components and systems illustrated in FIGS. 3-5 and described below. For example, one or more components and systems can include those associated with one or more of the one or more sensor systems 404 and 506, one or more of the perception components 304, 406, and 522, and/or one or more of the planning components 418 and 528. In some examples, the one or more operations of the process 100 may also, or instead, be performed by a remote system in communication with a vehicle, such as the perception component 544 and/or planning component 550 of the computing device(s) 538 illustrated in FIG. 5. Such processes may also, in turn, be performed by the device itself (e.g., using onboard electronics) such that a standalone device may produce such signals without the need for additional computational resources. In still other examples, the one or more operations of the process 200 may be performed by a combination of a remote system and a vehicle computing systems. However, the process 200 is not limited to being performed by such components and systems, and the components and systems of FIGS. 3-5 are not limited to performing the process 200.

At operation 202, data may be received or otherwise determined (e.g., as performed at the operations of process 100 illustrated in FIG. 1) for unlabeled lidar segments in a training dataset. In various examples, such data may include intensity data for individual lidar segments and indications for individual lidar segments of whether the respective segments are associated with a drivable road or region.

At operation 204, the system may determine whether a particular unlabeled lidar segment for which data was received and/or determined at operation 202 is associated with a drivable road. If the segment is associated with a non-drivable region (e.g., not associated with a drivable road), at operation 206 the system may determine whether a lidar intensity value associated with the unlabeled lidar segment is within a non-drivable region low range of intensity values. The non-drivable region low range of intensity values may include a range of specific intensity values (between zero and ten, between zero and 20, etc.), a range of intensity percentages (e.g., between zero and ten percent of the total intensity value range, between zero and 20 percent of the total intensity value range, etc.), or any suitable range that may represent a range of intensity values. If so, at operation 208, the system may not label the unlabeled lidar segment and/or may indicate that the lidar segment is unlabeled. If the lidar intensity value associated with the unlabeled lidar segment is within a non-drivable region high range of intensity values, at operation 210 the system may label the unlabeled lidar segment as an impeding object. The non-drivable region high range of intensity values may include a range of specific intensity values (between 10 and 255, between 20 and 255, etc.), a range of intensity percentages (e.g., between 10 percent and 100 percent of the total intensity value range, between 20 percent and 100 percent of the total intensity value range, etc.), or any suitable range that may represent a range of intensity values.

If, at operation 204, the system determines that the unlabeled lidar segment is associated with a drivable road, at operation 212 the system may determine whether the lidar intensity value associated with the unlabeled lidar segment is within a drivable region low range of intensity values. The drivable region low range of intensity values may include a range of specific intensity values (between zero and one, between zero and ten, etc.), a range of intensity percentages (e.g., between zero and one percent of the total intensity value range, between zero and 10 percent of the total intensity value range, etc.), or any suitable range that may represent a range of intensity values. If so, at operation 216, the system may label the unlabeled lidar segment as a non-impeding object.

If the system determines at operation 212 that the lidar intensity value associated with the unlabeled lidar segment is not within the drivable region low range of intensity values, the system may determine at operation 214 whether the lidar intensity value associated with the unlabeled lidar segment is within a drivable region moderate range of intensity values. The drivable region moderate range of intensity values may include a range of specific intensity values (between one and ten, between ten and twenty, etc.), a range of intensity percentages (e.g., between one percent and ten percent of the total intensity value range, between ten percent and twenty percent of the total intensity value range, etc.), or any suitable range that may represent a range of intensity values. If the lidar intensity value is within the drivable region moderate range of intensity values, at operation 218 the system may not label the unlabeled lidar segment and/or may indicate that the lidar segment is unlabeled.

If the system determines at operation 214 that the lidar intensity value associated with the unlabeled lidar segment is within a drivable region high range of intensity values (e.g., not within the drivable region low range of intensity values or drivable region moderate range of intensity values), at operation 220 the system may label the unlabeled lidar segment as an impeding object. The drivable region high range of intensity values may include a range of specific intensity values (between 10 and 255, between 20 and 255, etc.), a range of intensity percentages (e.g., between 10 percent and 100 percent of the total intensity value range, between 20 percent and 100 percent of the total intensity value range, etc.), or any suitable range that may represent a range of intensity values.

FIG. 3 is a block diagram of an example lidar perception and non-impeding object tracking system 300 according to various examples. The system 300 may be implemented at a vehicle (e.g., an autonomous vehicle) by a vehicle computing system and may include one or more of the components and systems illustrated in FIGS. 3-5 and described below. For example, one or more components and systems can include those associated with one or more of the one or more sensor systems 404 and 506, one or more of the perception components 304, 406, and 522, and/or one or more of the planning components 418 and 528. In some examples, the one or more components of the system 300 may also, or instead, be implemented at a remote system in communication with a vehicle, such as the perception component 544 and/or planning component 550 of the computing device(s) 538 illustrated in FIG. 5. In still other examples, one or more operations of the system 300 may be implemented as a combination of a components at a remote system and a vehicle computing system. However, the system 300 is not limited to being performed by such components and systems, and the components and systems of FIGS. 3-5 are not limited to implementing the system 300.

Lidar sensor data 302 may be generated, determined, received, and/or provided to the system 300. In various examples, a vehicle configured with one or more lidar sensors may be operate such sensors to emit lidar pulses into an environment and detect lidar return pulses reflected from surfaces in the environment. Such sensors may then collect and store the return lidar pulses and/or associated data. In examples such sensors may perform processing and/or generation of data based on the detected return pulses to generate lidar sensor data 302.

For example, individual lidar sensors may include one or more processing components configured to execute a machine-learned model (e.g., convolutional neural network (CNN) model trained as described herein) to detect and label one or more lidar points. Such sensors may determine three-dimensional properties of individual detected lidar return pulses (e.g., lidar points) such as depth, height, and intensity and use such properties to generate one or more (e.g., semantic) labels for such lidar points. This labeling may include labeling one or more such points as "impeding" or "non-impeding." Such sensors may also, or instead, determine not to label one or more lidar points, instead leaving such points unlabeled and/or otherwise indicated as unlabeled. Such label data determined by one or more lidar sensors may be represented in the lidar sensor data 302. In various embodiments, one or more downstream components may determine and/or apply one or more labels to unlabeled lidar points. One or more downstream components may also, or instead, change or otherwise alter one or more labels applied to one or more lidar points by a lidar system and/or represented in the lidar sensor data 302.

In various embodiments, one or more lidar sensors may voxelize lidar point data to generate a three-dimensional representation of the lidar points in an environment that may be represented in the lidar sensor data 302. For example, the vehicle computing system may determine the lidar points determined based on return lidar pulses detected in the environment, determine portions of the environment within which the individual lidar points are located, and determine voxels for those portions of the environment. The one or more lidar sensors may aggregate data associated with the individual lidar point in individual voxels to determine voxel data for the individual voxels. If there are multiple types of lidar point data available for an individual lidar point or combination of lidar points (e.g., lidar intensity, return distances, return distance differences, propagation time difference, static probabilities, etc.), the vehicle computing system may determine an aggregate value for individual types of lidar point data for individual voxels. This aggregation may be an averaging function that averages a particular type of lidar point data within a voxel or some other function. The function(s) use to determine aggregated voxel data may vary based on the data being aggregated. The one or more lidar sensors may perform labeling operations for individual lidar points based on data associated with such individual points and/or for individual voxels based on aggregated data associated with such individual voxels.

The lidar sensor data 302 representing lidar data from one or more lidar sensor configured at a vehicle (e.g., from all lidar sensors configured at the vehicle) may be received at or otherwise obtained by a lidar perception system 304. The lidar perception system 304 may include a top-down segmentation component 306 that may receive the lidar sensor data 302. The top-down segmentation component 306 may include a CNN 308 that may be configured to execute a machine-learned model that uses the lidar sensor data 302 (e.g., the voxelized lidar data, three-dimensional lidar point data, and/or any other lidar point data and/or associated data determined by one or more lidar sensors) to generate a two-dimensional data representing the environment in which the vehicle may be traveling. For example, this two-dimensional data may represent a top-down two-dimensional grid representation of the environment and may include any representations and/or aggregations of the lidar sensor data.

The top-down segmentation component 306 may use the two-dimensional data determined by the CNN 308 to determine lidar segment data based on lidar point data represented in the two-dimensional data. The determined lidar segment data may represent one or more lidar segments in the environment. In various embodiments, the top-down segmentation component 306 may represent such lidar segments as connected cells in a top-down two-dimensional grid representation of the environment determined by the CNN 308. The lidar segment data determined by the top-down segmentation component 306 may also, or instead, take other forms.

The top-down segmentation component 306 may determine labels for the one or more lidar segments represented in the determined lidar segment data. For example, the top-down segmentation component 306 may associated the labels that were associated with individual lidar points in a particular segment with that segment. Alternatively or additionally, the top-down segmentation component 306 may determine labels for one or more lidar segments (e.g., even if already labeled in based on the lidar sensor data) based on associated segment data and/or lidar point data associated with the lidar points with such segments. In various examples, the top-down segmentation component 306 may not determine labels for all segments in the determined lidar segment data, leaving one or more segments unlabeled in the lidar segment data unlabeled. In various other examples, the top-down segmentation component 306 may not determine labels for any segments in the determined lidar segment data, leaving all segments represented in the lidar segment data unlabeled. In such examples, unlabeled lidar segments may be labeled by one or more downstream components, for example, as described herein.

The top-down segmentation component 306 may provide determined lidar segment data to the lidar segment classifier component 310. In various embodiments, the lidar segment classifier component 310 may include one or more segment classifiers 312, which may include one or more auto-labeling classifiers that assign impeding or non-impeding labels to unlabeled segments as described herein. Such auto-labeling classifiers may execute a machine-learned model trained according to the disclosed examples. The one or more segment classifiers 312 may also, or instead, include classifiers that assign or otherwise determine labels for other types of segments and/or objects, including segments and/or objects that have been previously labeled. Alternatively, the lidar segment classifier 310 may be dedicated to classifying unlabeled segments.

In various examples, an auto-labeling classifier configured among the segment classifier(s) 312 may determine one or more unlabeled segments in the lidar segment data received from the top-down segmentation component 306. The auto-labeling classifier may determine whether to label such segments as "impeding" or "non-impeding." as described herein. In various examples, the auto-labeling classifier may not label a segment, instead determining to leave the segment unlabeled based on the segment data (e.g., the intensity associated with the segment). Where a segment remains unlabeled, in various examples one or more other classifiers (e.g., from among the segment classifier(s) 312) may determine a label for such a segment.

The lidar segment classifier component 310 may further include one or more consistency components 314. The consistency component(s) 314 may determine whether a label associated with a lidar segment (e.g., by the segment classifier(s) 312) is appropriate and/or accurate, for example, using one or more consistency and/or probability algorithms and lidar segment data and/or other available data. If the consistency component(s) 314 determine that a label is inaccurate, the consistency component(s) 314 may adjust the label and/or replace the label with a more accurate label. In some examples, the consistency component(s) 314 may also be a final check to ensure that individual lidar segments are labeled and may determine and assign a label to any such segments that remain unlabeled. Alternatively, the segment classifier(s) 312 may be configured to determine and assign a label to the individual lidar segments represented in the lidar segment data received from the top-down segmentation component 306 and the consistency component(s) 314 may verify and adjust such labels as-needed.

The lidar segment classifier 310 may determine impeding segment data 316 and non-impeding segment data 318. In various examples, the impeding segment data 316 may include data associated with any lidar segment that is labeled with any label other than "non-impeding" (e.g., pedestrian, vehicle, bicycle, impeding, barrel, etc.). The non-impeding segment data 318 may include data associated with any lidar segment that is labeled as "non-impeding." As noted, such segments may be associated with non-impeding objects that do not impede the motion of vehicle in the environment (e.g., fine particulate matter (e.g., dust), gases (fog, steam, smoke), other objects immaterial to vehicle progress (e.g., unused plastic bag, paper debris, tumbleweed, leaves, etc.)).

The impeding segment data 316 and non-impeding segment data 318 may be provided to a sensor fusion and tracking system 320. The sensor fusion and tracking system 320 may use lidar segment data and other types of sensor data (e.g., data from camera sensors, radar sensors, sonar sensors, ultrasonic sensors, inertial sensors, GPS, etc.) to determine tracking data for objects in an environment and/or the vehicle itself. In various examples, the sensor fusion and tracking system 320 may include a non-impeding object racking system 322 that may use the non-impeding segment data 318, in examples in conjunction with other sensor data, to determine tracking data such as non-impeding object tracks 324, for one or more non-impeding objects. A vehicle computing system may use the non-impeding object tracks 324 to control a vehicle. For example, a vehicle computing system may determine to slow down the vehicle when approaching a non-impeding object represented in the non-impeding object tracks 324 (e.g., rather than stop or drive around the object as it may if the object was an impeding object).

Figure 4A:
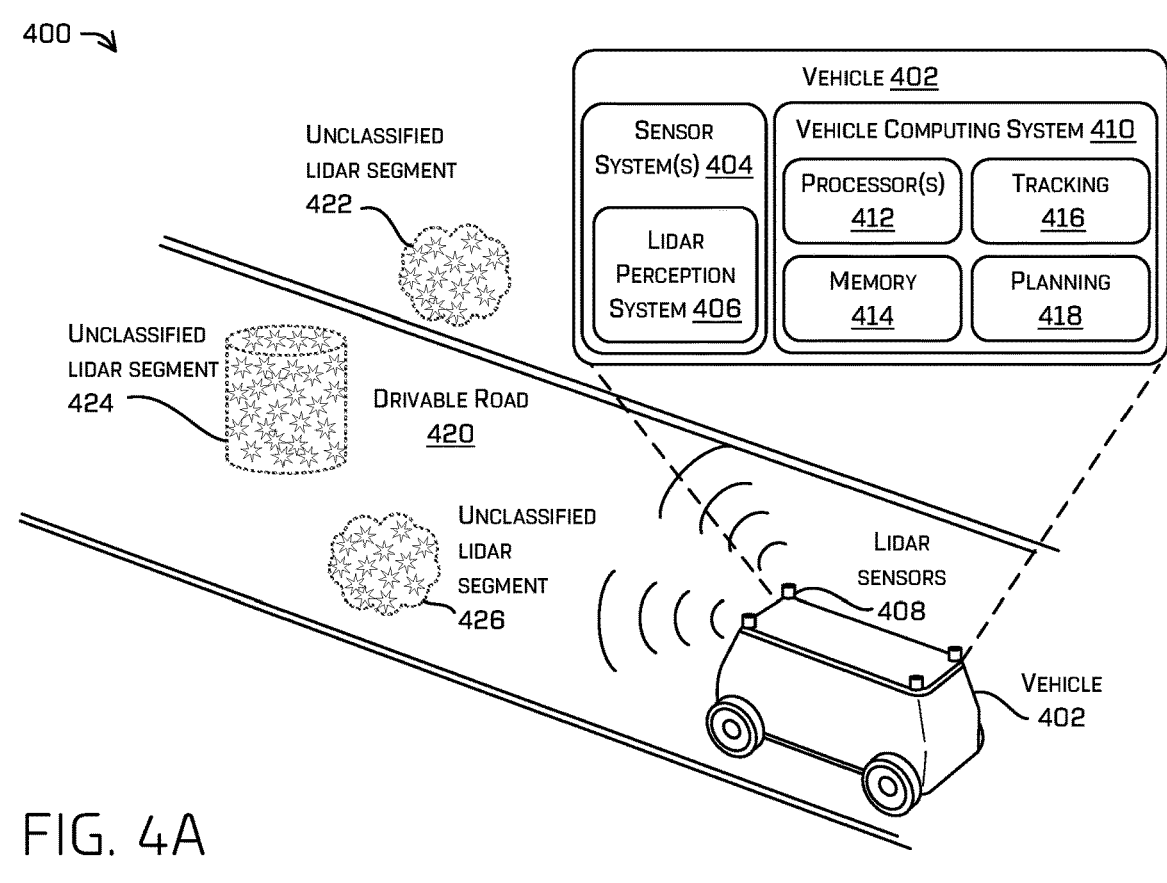
FIG. 4A is a diagram of an example environment in which a vehicle is encountering candidate non-impeding objects as represented by unlabeled lidar segments, in accordance with examples of the disclosure.
Figure 5:
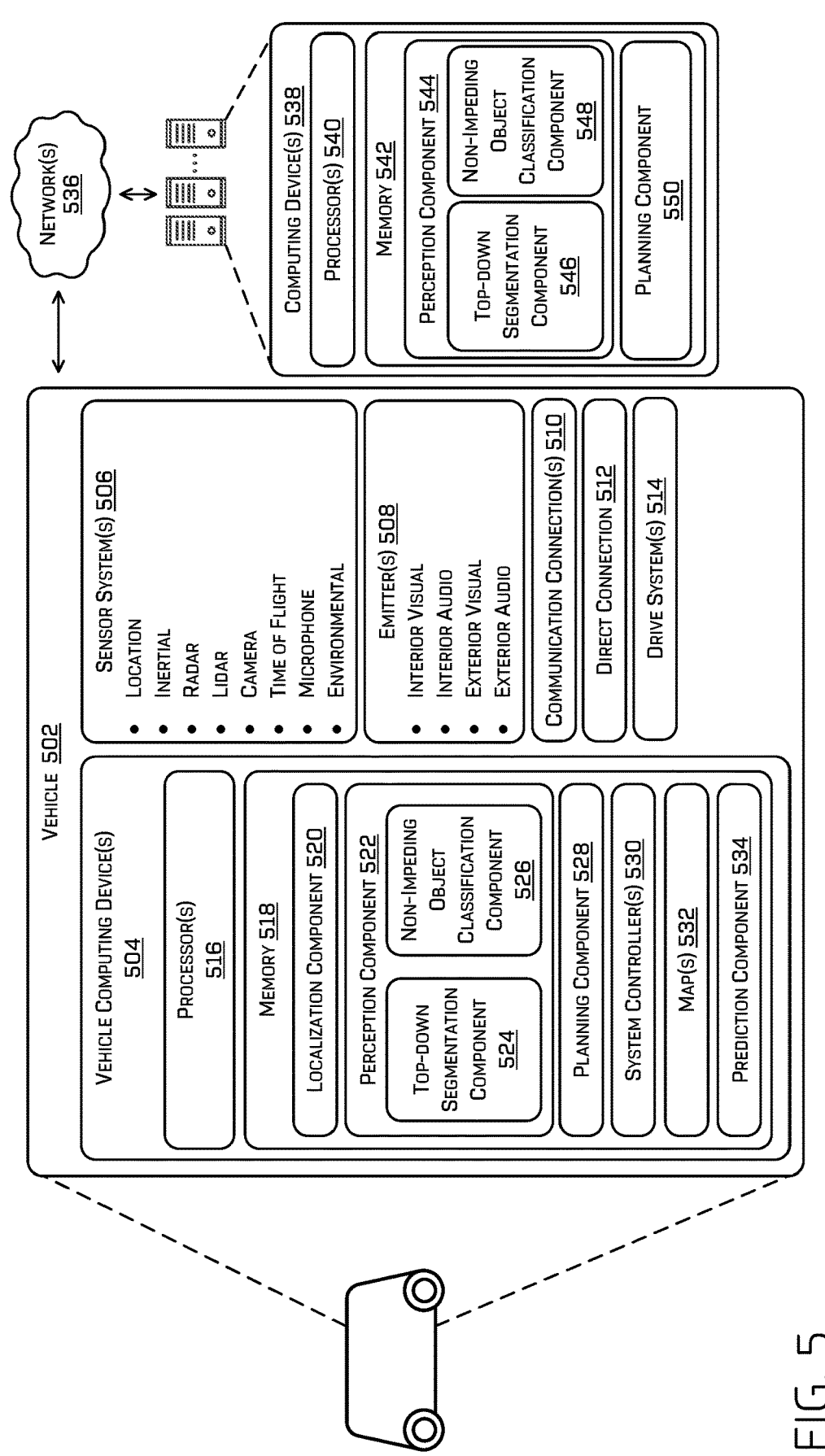
FIG. 5 is a block diagram of an example system for implementing the techniques described herein.

FIG. 4A is a perspective view of an example environment 400 in which a vehicle 402 may be traveling. The vehicle 202 may be configured with a sensor system 404 that may include a lidar perception system 406. The lidar perception system 406 may include emitters/sensors 408 that may be configured to emit one or more lidar pulses into the environment 400 and detect one or more return lidar pulses resulting from reflections of the lidar pulses emitted into the environment 400. The vehicle 402 may further be configured with a vehicle computing system 410 that may include one or more processors 412, a memory 414, a tracking component 416, and a planning component 418, any one or more of which may be used to perform one or more of the operations described herein.

The environment 400 may include a drivable road 420 and various objects that may have surfaces that may have reflected lidar pulses emitted by the lidar sensors 408, resulting in the determination (e.g., by a top-down segmentation component of the lidar perception system 406) of various types of lidar segments within the environment 400. Among such segments may be unclassified lidar segments such as unclassified lidar segments 422, 424 and 426. Other segments in environment (not shown) may be associated with other types of objects and may have been labeled accordingly.

The lidar perception system 406 may include a machine-learned model that may be trained according to the examples disclosed herein. The lidar perception system 406 may execute the machine-learned model to perform classification and/or labeling operations as described herein to determine one or more classifications for the unclassified lidar segments 422, 424 and 426. The classification data and associated lidar segment data for unclassified lidar segments 422, 424 and 426 may be provided to the tracking component 416 for use in determining tracks for the objects associated with the unclassified lidar segments 422, 424 and 426. For example, the lidar perception system 406 may classify the unclassified lidar segment 422 that is not within the drivable road 422 (e.g., is associated with a non-drivable region) as an impeding lidar segment. The lidar perception system 406 may further classify the unclassified lidar segment 424 that is in the drivable road 420 as an impeding lidar segment. The lidar perception system 406 may further classify the unclassified lidar segment 464 that is in the drivable road 420 as a non-impeding lidar segment.

Figure 4B:
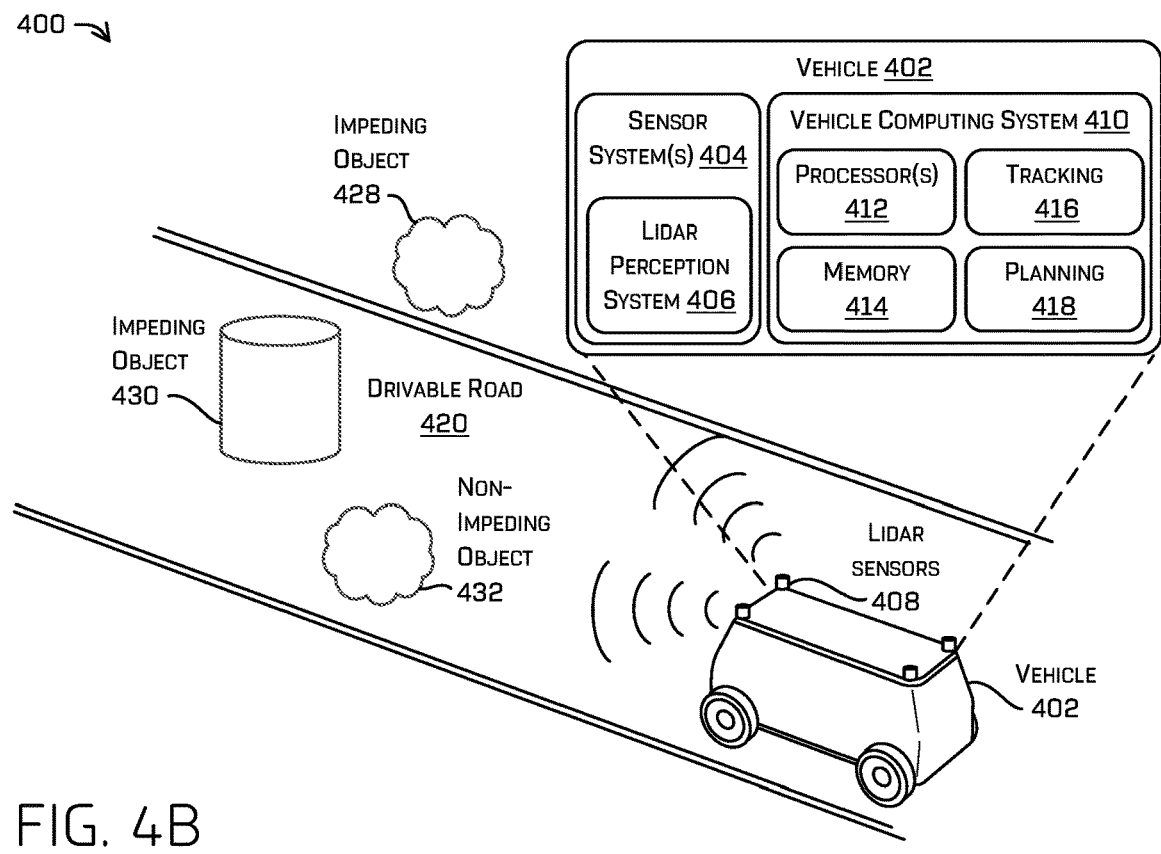
FIG. 4B is a diagram of the example environment of FIG. 4A in which the vehicle is determining a classification for the candidate non-impeding objects based on the associated unlabeled lidar segments, in accordance with examples of the disclosure.

The tracking component 416 may use this data, in some examples in conjunction with other data, to determine the objects associated with such (now) classified lidar segment and the tracks associated with such objects. Referring now to FIG. 4B, the vehicle computing system 402, and in particular examples the tracking component 416, may determine that the object 428 associated with the (now) classified impeding lidar segment 422 is an impeding object that is not in the drivable road 420. Similarly, the tracking component 416 may determine that the object 430 associated with the (now) classified impeding lidar segment 424 is an impeding object that is in the drivable road and may determine a track (e.g., predicted path of travel within the environment 400) for the impeding object 430. The tracking component 416 may also, or instead, determine that the object 432 associated with the (now) classified non-impeding lidar segment 426 is a non-impeding object that is in the drivable road and may determine a track for the non-impeding object 432.

The vehicle computing system 410 may use the planning component 418 to determine a trajectory for the vehicle 402 based on the objects determined using the lidar segment data determined the lidar perception system 406. For example, the planning component may generate a trajectory that slow the vehicle while encountering the non-impeding object 430 and that steers the vehicle around the impeding object 430. Because the impeding object 428 is not within the drivable road 420, the vehicle computing system 410 may not use data associated with the object 428 to generate a track for that object and/or plan a trajectory for the vehicle 402. Alternatively, the vehicle computing system 410 may use data associated with the object 428 to generate a track for that object and/or generate a vehicle trajectory, for example, updating the trajectory if the predicted track for the object 428 indicates that the object is going to enter into the drivable road 420.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522 that may include a top-down segmentation component 524 and/or a non-impeding object classification component 526 that may be configured to perform one or more of the object auto-labeling and machine-learned model training operations described herein, a planning component 528, one or more system controllers 530, one or more maps 532, and a prediction component 534. Though depicted in FIG. 5 as residing in memory 518 for illustrative purposes, it is contemplated that any one or more of the localization component 520, the perception component 522, the top-down segmentation component 524, the non-impeding object classification component 526, the planning component 528, the one or more system controllers 530, the one or more maps 532, and the prediction component 534 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification, in addition to, or instead of, object auto-labeling and machine-learned model training operations as described herein. For example, the perception component may include functionality to analyze lidar return pulse intensity data to determine whether to label a lidar segment as impeding or non-impeding, as described herein. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, unknown). In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as the voxel data structures generated by the described voxelization process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation, intensity, etc. Such entity characteristics may be represented in a data structure as described herein (e.g., a voxel data structure generated as output of one or more voxelization operations, a two-dimensional grid of cells containing data, etc.). Characteristics associated with the environment can include, but are not limited to, a presence of another entity in the environment, a state of another entity in the environment, a time of day, a day of a week, a season, a weather condition, an indication of darkness/light, etc. In some examples, the perception component 522 can provide processed return pulse data as described herein.

In general, the planning component 528 can determine a path for the vehicle 502 to follow to traverse through an environment. In some examples, the planning component 528 can determine various routes and trajectories and various levels of detail. For example, the planning component 528 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, and/or the planning component 528 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year). Storing multiple maps 532 can have similar memory requirements but increase the speed at which data in a map can be accessed.

In general, the prediction component 534 can generate predicted trajectories of objects in an environment. For example, the prediction component 534 can generate one or more predicted trajectories for vehicles, pedestrians, animals, and the like within a threshold distance from the vehicle 502. In some instances, the prediction component 534 can measure a trace of an object and generate a trajectory for the object based on observed and predicted behavior. In some examples, the prediction component 534 can use data and/or data structures based on return pulses as described herein to generate one or more predicted trajectories for various mobile objects in an environment. In some examples, the prediction component 534 may be a subcomponent of perception component 522.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may one or more convolution/deconvolution layers. Such a CNN may be a component of and/or interact with the top-down segmentation component 524 and/or the non-impeding object classification component 526.

An example neural network is an algorithm that passes input data through a series of connected layers to produce an output. Individual layers in a neural network can also comprise another neural network or can comprise any number of layers, and such individual layers may convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network Stacked (CNN), Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time of flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 536, to the one or more computing device(s) 538 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable road presence, and/or other data as described herein.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., data representing return pulses) to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a planning component 550 and/or a perception component 544 that may include a top-down segmentation component 546 and/or a non-impeding object classification component 548 that may be configured to perform one or more of the object auto-labeling and machine-learned model training operations described herein. In some instances, the perception component 544 can substantially correspond to the perception component 522 and can include substantially similar functionality. In some instances, the planning component 550 can substantially correspond to the planning component 528 and can include substantially similar functionality.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the techniques and operations described herein and the functions attributed to the various disclosed systems. In various implementations, the memory 518 and 542 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving lidar data associated with an environment, the lidar data comprising one or more labeled lidar segments and one or more unlabeled lidar segments: determining one or more lidar segments associated with a drivable region of the environment from the one or more unlabeled lidar segments: determining one or more lidar segments associated with a non-drivable region of the environment from the one or more unlabeled lidar segments: determining an intensity value for a first lidar segment of the one or more lidar segments associated with the drivable region of the environment: determining an intensity value for a second lidar segment of the one or more lidar segments associated with the non-drivable region of the environment: determining a first lidar intensity value range associated with the drivable region of the environment and corresponding to the intensity value for the first lidar segment: determining a second lidar intensity value range associated with a non-drivable region of the environment and corresponding to the intensity value for the second lidar segment: assigning a first label to the first lidar segment based at least in part on the first lidar intensity value range: assigning a second label to the second lidar segment based at least in part on the second lidar intensity value range; and training a machine-learned (ML) model to detect a non-impeding object based at least in part on the first label, the first lidar segment, the second label, and the second lidar segment.

B: The system of paragraph A, wherein the operations further comprise: determining a third lidar intensity value range associated with the drivable region of the environment and corresponding to an intensity value for a third lidar segment of the one or more lidar segments associated with the drivable region of the environment, wherein the third lidar intensity value range comprises values greater than values of the first lidar intensity value range and less than values of a fourth lidar intensity value range associated with the drivable region of the environment; and assigning no label to the third lidar segment based at least in part on the third lidar intensity value range.

C: The system of paragraph A or B, wherein determining the first lidar intensity value range corresponding to the intensity value for the first lidar segment comprises: determining a plurality of lidar intensity value ranges associated with the drivable region of the environment, the plurality of lidar intensity value ranges comprising the first lidar intensity value range; and determining that the intensity value for the first lidar segment is represented among values of the first lidar intensity value range.

D: The system of any of paragraphs A-C, wherein determining the second lidar intensity value range corresponding to the intensity value for the second lidar segment comprises: determining a plurality of lidar intensity value ranges associated with the non-drivable region of the environment, the plurality of lidar intensity value ranges comprising the first lidar intensity value range and a third lidar intensity value range, wherein values of the second lidar intensity value range are greater than values of the third lidar intensity value range; and determining that the intensity value for the second lidar segment is represented among the values of the second lidar intensity value range.

E: The system of any of paragraphs A-D, wherein the environment is a first environment and the operations further comprise transmitting the ML model to a vehicle configured to traverse a second environment based at least in part on output received from the ML model.

F: A method comprising: determining lidar data associated with an environment, the lidar data comprising an unlabeled lidar segment: determining that the unlabeled lidar segment is associated with a drivable region of the environment: determining an intensity value associated with the unlabeled lidar segment: determining a plurality of intensity value ranges based at least in part on determining that the unlabeled lidar segment is associated with the drivable region of the environment; and assigning a label to the unlabeled lidar segment based at least in part on determining that the intensity value is within an intensity value range of the plurality of intensity value ranges.

G: The method of paragraph F, wherein: the intensity value range is a highest intensity value range among the plurality of intensity value ranges; and the label indicates that the unlabeled lidar segment is associated with an impeding object.

H: The method of paragraph F or G, wherein: the intensity value range is a lowest intensity value range among the plurality of intensity value ranges; and the label indicates that the unlabeled lidar segment is associated with a non-impeding object.

I: The method of any of paragraphs F-H, wherein determining the lidar data comprises: receiving sensor data from a plurality of sensors; and determining a plurality of two-dimensional lidar segments comprising the unlabeled lidar segment based at least in part on the sensor data.

J: The method of any of paragraphs F-I, wherein the plurality of intensity value ranges comprises: a lowest range associated with non-impeding objects: a moderate range associated with no label; and a highest range associated with impeding objects.

K: The method of claim paragraph J, wherein values of the moderate range are greater than values of the lowest range and less than values of a highest range.

L: The method of any of paragraphs F-K, further comprising: determining one or more lidar points represented in the lidar data that are not associated with one or more lidar segments represented in the lidar data; and filtering the one or more lidar points from the lidar data.

M: The method of any of paragraphs F-L, further comprising training a machine-learned (ML) model to detect a non-impeding object based at least in part on labeled lidar data comprising the label and data associated with the unlabeled lidar segment.

N: The method of paragraph M, further comprising transmitting the ML model to a vehicle configured to control the vehicle based at least in part on output received from the ML model.

O: One or more non-transitory computer-readable media storing instructions that, when executed by one or more processors, perform operations comprising: receiving lidar data associated with an environment, the lidar data comprising an unlabeled lidar segment: determining that the unlabeled lidar segment is associated with a non-drivable region of the environment: determining an intensity value associated with the unlabeled lidar segment: determining a plurality of intensity ranges based at least in part on determining that the unlabeled lidar segment is associated with the non-drivable region of the environment; and assigning a label to the unlabeled lidar segment based at least in part determining that the intensity value is associated with an intensity range of the plurality of intensity ranges.

P: The one or more non-transitory computer-readable media of paragraph O, wherein the operations further comprise: determining a second intensity value associated with a second unlabeled lidar segment of the lidar data that is associated with a non-drivable region of the environment; and determining to assign no label to the second unlabeled lidar segment based at least in part determining that the second intensity value is within a second intensity range of the plurality of intensity ranges.

Q: The one or more non-transitory computer-readable media of paragraph O or P, wherein: the intensity range is a highest intensity range among the plurality of intensity ranges; and the second intensity range is a lowest intensity range among the plurality of intensity ranges.

R: The one or more non-transitory computer-readable media of any of paragraphs O-Q, wherein the intensity range comprises one or more of: a range of intensity values; or a range of intensity percentages.

S: The one or more non-transitory computer-readable media of paragraph R, wherein determining the plurality of intensity ranges comprises determining the plurality of intensity ranges from among a plurality of ranges comprising a non-drivable region plurality of intensity ranges and a drivable region plurality of intensity ranges.

T: The one or more non-transitory computer-readable media of any of paragraphs O-S, wherein the operations further comprise training a machine-learned (ML) model to detect a non-impeding object based at least in part on the unlabeled lidar segment and determining whether to assign the label to the unlabeled lidar segment.

While the example clauses described above are described with respect to one particular implementation, it should be understood that, in the context of this document, the content of the example clauses can also be implemented via a method, device, system, computer-readable medium, and/or another implementation.

Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing instructions executable by the one or more processors, wherein the instructions, when executed, cause the system to perform operations comprising:

receiving lidar data associated with an environment, the lidar data comprising one or more labeled lidar segments and one or more unlabeled lidar segments;

determining one or more first lidar segments associated with a drivable region of the environment from the one or more unlabeled lidar segments;

determining one or more second lidar segments associated with a non-drivable region of the environment from the one or more unlabeled lidar segments;

determining an intensity value for a first lidar segment of the one or more first lidar segments;

determining an intensity value for a second lidar segment of the one or more second lidar segments;

determining a first lidar intensity value range associated with the drivable region of the environment and corresponding to the intensity value for the first lidar segment;

determining a second lidar intensity value range associated with the non-drivable region of the environment and corresponding to the intensity value for the second lidar segment;

assigning a first label to the first lidar segment based at least in part on the first lidar intensity value range;

assigning a second label to the second lidar segment based at least in part on the second lidar intensity value range;

assigning no label to a third lidar segment of at least one of the one or more first lidar segments or the one or more second lidar segments based at least in part on determining that a third intensity value associated with the third lidar segment is within a third lidar intensity value range associated with one of the drivable region of the environment or the non-drivable region of the environment; and controlling a vehicle based at least in part on the first label and the second label.

2. The system of claim 1, wherein:

the third lidar intensity value range comprises values greater than values of the first lidar intensity value range and less than values of a fourth lidar intensity value range associated with the drivable region of the environment.

3. The system of claim 1, wherein determining the first lidar intensity value range corresponding to the intensity value for the first lidar segment comprises:

determining a plurality of lidar intensity value ranges associated with the drivable region of the environment, the plurality of lidar intensity value ranges comprising the first lidar intensity value range; and determining that the intensity value for the first lidar segment is represented among values of the first lidar intensity value range.

4. The system of claim 1, wherein determining the second lidar intensity value range corresponding to the intensity value for the second lidar segment comprises:

determining a plurality of lidar intensity value ranges associated with the non-drivable region of the environment, the plurality of lidar intensity value ranges comprising the first lidar intensity value range and the third lidar intensity value range, wherein values of the second lidar intensity value range are greater than values of the third lidar intensity value range; and determining that the intensity value for the second lidar segment is represented among the values of the second lidar intensity value range.

5. The system of claim 1, wherein the environment is a first environment and the operations further comprise transmitting a machine-learned (ML) model trained to detect a non-impeding object based at least in part on the first label, the first lidar segment, the second label, and the second lidar segment to a second vehicle configured to traverse a second environment based at least in part on output received from the ML model.

6. A method comprising:

determining lidar data associated with an environment, the lidar data comprising a first unlabeled lidar segment and a second unlabeled lidar segment;

determining that the first unlabeled lidar segment is associated with a drivable region of the environment;

determining a first intensity value associated with the first unlabeled lidar segment;

determining a plurality of intensity value ranges based at least in part on determining that the first unlabeled lidar segment is associated with the drivable region of the environment;

assigning a label to the first unlabeled lidar segment based at least in part on determining that the first intensity value is within a first intensity value range of the plurality of intensity value ranges;

assigning no label to the second unlabeled lidar segment based at least in part on determining that a second intensity value associated with the second unlabeled lidar segment is within a second intensity value range of the plurality of intensity value ranges; and controlling a vehicle based at least in part on the label.

7. The method of claim 6, wherein:

the first intensity value range is a highest intensity value range among the plurality of intensity value ranges; and the label indicates that the first unlabeled lidar segment is associated with an impeding object.

8. The method of claim 6, wherein:

the first intensity value range is a lowest intensity value range among the plurality of intensity value ranges; and the label indicates that the first unlabeled lidar segment is associated with a non-impeding object.

9. The method of claim 6, wherein determining the lidar data comprises:

receiving sensor data from a plurality of sensors; and determining a plurality of two-dimensional lidar segments comprising the first unlabeled lidar segment based at least in part on the sensor data.

10. The method of claim 6, wherein the plurality of intensity value ranges comprises:

a lowest range associated with non-impeding objects;

a moderate range associated with no label; and a highest range associated with impeding objects.

11. The method of claim 10, wherein values of the moderate range are greater than values of the lowest range and less than values of a highest range.

12. The method of claim 6, further comprising:

determining one or more lidar points represented in the lidar data that are not associated with one or more lidar segments represented in the lidar data; and filtering the one or more lidar points from the lidar data.

13. The method of claim 6, further comprising training a machine-learned (ML) model to detect a non-impeding object based at least in part on labeled lidar data comprising the label and data associated with the first unlabeled lidar segment.

14. The method of claim 13, further comprising transmitting the ML model to a second vehicle which is configured to be controlled based at least in part on output received from the ML model.

15. One or more non-transitory computer-readable media storing instructions that, when executed by one or more processors, cause the one or more processors to perform operations comprising:

receiving lidar data associated with an environment, the lidar data comprising a first unlabeled lidar segment and a second unlabeled lidar segment;

determining that the first unlabeled lidar segment is associated with a non-drivable region of the environment;

determining a first intensity value associated with the first unlabeled lidar segment;

determining a plurality of intensity ranges based at least in part on determining that the first unlabeled lidar segment is associated with the non-drivable region of the environment;

assigning a label to the first unlabeled lidar segment based at least in part determining that the first intensity value is associated with a first intensity range of the plurality of intensity ranges;

assigning no label to the second unlabeled lidar segment based at least in part on determining that a second intensity value associated with the second unlabeled lidar segment is within a second intensity range of the plurality of intensity ranges; and controlling a vehicle based at least in part on the label.

16. The one or more non-transitory computer-readable media of claim 15, wherein:

the second unlabeled lidar segment is associated with a drivable region of the environment.

17. The one or more non-transitory computer-readable media of claim 15, wherein:

the first intensity range is a highest intensity range among the plurality of intensity ranges; and the second intensity range is a lowest intensity range among the plurality of intensity ranges.

18. The one or more non-transitory computer-readable media of claim 15, wherein the first intensity range comprises one or more of:

a range of intensity values; or a range of intensity percentages.

19. The one or more non-transitory computer-readable media of claim 18, wherein determining the plurality of intensity ranges comprises determining the plurality of intensity ranges from among a plurality of ranges comprising a non-drivable region plurality of intensity ranges and a drivable region plurality of intensity ranges.

20. The one or more non-transitory computer-readable media of claim 15, wherein the operations further comprise training a machine-learned (ML) model to detect a non-impeding object based at least in part on the first unlabeled lidar segment and determining whether to assign the label to the first unlabeled lidar segment.

* * * * *